United States Patent
Martin et al.

[11] 3,912,151
[45] Oct. 14, 1975

[54] TUBE WELDING METHOD

[75] Inventors: Guy E. Martin, Pittsburgh; Melvin R. Fahnestock, Apollo; Richard Couchman, New Kensington; Guy W. Mahan, Arnold, all of Pa.; Hugh R. Bundy, Massena, N.Y.; Robert C. Pahl, West Lafayette, Ind.

[73] Assignee: Aluminum Company of America, Pittsburgh, Pa.

[22] Filed: Sept. 16, 1974

[21] Appl. No.: 506,619

[52] U.S. Cl.................................. 228/171; 228/170
[51] Int. Cl.².................................. B23K 31/02
[58] Field of Search......... 29/202 D, 463, 476, 477, 29/477.3, 477.7, 482, 483, 484, 33 D, 157 T; 113/116 B, 116 UT; 228/4, 44, 45, 48, 60

[56] References Cited
UNITED STATES PATENTS

| | | | |
|---|---|---|---|
| 2,288,094 | 6/1942 | Karmazin | 29/477.3 |
| 2,693,632 | 11/1954 | Heussner | 29/477 |
| 2,948,061 | 8/1960 | Carstens | 29/463 |
| 3,412,454 | 11/1968 | Cardiff | 113/116 U T |
| 3,716,908 | 2/1973 | Rowell | 29/477 X |
| 3,722,075 | 3/1973 | Fay | 29/477.3 |
| 3,775,835 | 12/1973 | Cauffiel | 29/477.3 |

*Primary Examiner*—Al Lawrence Smith
*Assistant Examiner*—Margaret M. Joyce
*Attorney, Agent, or Firm*—Elroy Strickland, Esq.

[57] ABSTRACT

A method of joining the abutting ends of tubes together in a manner that provides a weld having good pulling, bending and thickness reduction capabilities.

The method comprising the steps of providing the tube ends with complementary angle cuts, the angle of each cut being less than 90° with respect to the axes of the tubing; placing and maintaining the cut ends of the tubes in mating, abutting relationship, the abutting ends providing an interface therebetween that is disposed at the same angle, with respect to the tubes axes, as that of the angle cuts; disposing said interface adjacent a welding head; and welding the tubes together along the mating, abutting ends.

12 Claims, 7 Drawing Figures

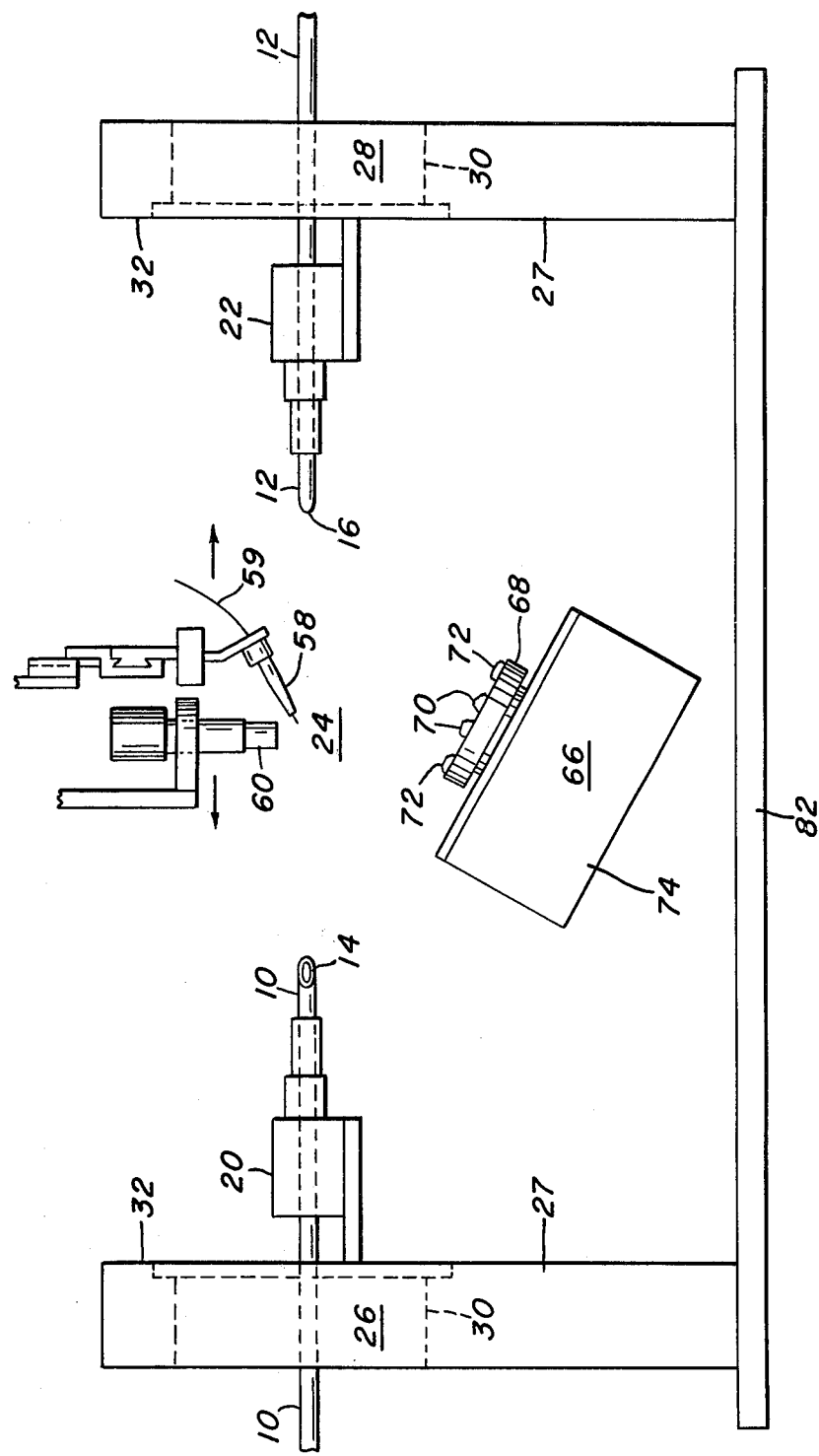

TUBE WELDING METHOD

BACKGROUND OF THE INVENTION

The present invention relates generally to a welding method, and particularly to a method of welding together the ends of abutting tubes for the purpose of providing a continuous length of tube for a drawing process.

In U.S. Pat. No. 3,765,215 issued in the name of Guy E. Martin, one of the present applicants, there is disclosed a method and apparatus for simultaneously and continuously reducing the cross section of tubing by directing the tubing through a plurality of drawing dies and around a plurality of rotating capstans located respectively between the dies. As indicated in the patent, the supply of tubing may be non-rotatable, in which case a free, stationary end of tubing is available for joining to the leading end of another adjacent supply of tubing to be drawn. In this manner, the amount of tubing to be drawn is substantially increased while simultaneously reducing the number of manual threading operations of the apparatus to one, i.e., by joining together the ends of tubing of adjacent, nonrotatable supplies thereof on a regular, continuous basis, a continuous supply of tubing is provided which requires no threading of the drawing apparatus after the initial threading of the leading tube end of the first supply. With such a continuous supply of tubing no stopping of the apparatus and interruption of the drawing process is required other than that needed for lubrication and maintenance purposes.

However, in the type of tube drawing process disclosed in the above patent, a weld employed to join the abutting ends of two tubes together undergoes severe working in that the weld is not only reduced in cross section and elongated with the pass of the weld through each of the drawing dies at substantial velocities, the weld is also pulled through each die under substantial tension, and is subject to bending stresses as the weld and tube are bent around the rotating capstans in the process of pulling the tubing from the dies.

Ordinary right angle butt welds, particularly in joining relatively thin wall tubing, have been found inadequate for the severe conditions encountered in drawing tube in the manner discussed above. Even if the right angle weld is able to withstand the drawing forces and pulling tensions imposed by the process, which is unlikely, it fails and breaks when the tubing is bent around the capstans. One reason for this failure is that the bending stresses place the outer radius of the weld in substantial additional tension, in comparision to the inner portion of weld adjacent the surface of the capstan, such that the weld, thinned and elongated by drawings, is weakened to the point of failure.

BRIEF SUMMARY OF THE INVENTION

The present invention provides a welded tube joint capable of withstanding the severe conditions encountered in multiple drawing processes. This is accomplished by providing the ends of the tubes to be welded with complementary angle cuts that are less than 90° with respect to the axis of the tubes, and at such an angle that a weld joining the cut ends of the tube together provides overlap portions of the tube wall that bend around the capstans in a manner that tends to reduce bending stresses in the weld and tube wall and that tends to reduce pulling tensions in the weld, as explained in detail hereinafter. The tube ends are welded together along the interface that is provided when the ends are disposed together in mating, abutting relationship. The weld may be effected by MIG or TIG welding processes and apparatus using closely controlled welding parameters.

In addition, for purposes explained hereinafter, an end length of each tube is preferably annealed before being provided with the angle cuts and welded. Other particulars and advantages of the invention are discussed in detail hereinafter.

THE DRAWINGS

The objectives and advantages of the invention will be more apparent after consideration of the following detailed description and drawings in which:

FIG. 3 is a diagrammatic elevation view of an apparatus for milling, rotating and welding the tubes of FIGS. 1 and 2;

PREFERRED EMBODIMENTS OF THE INVENTION

Figure 1:
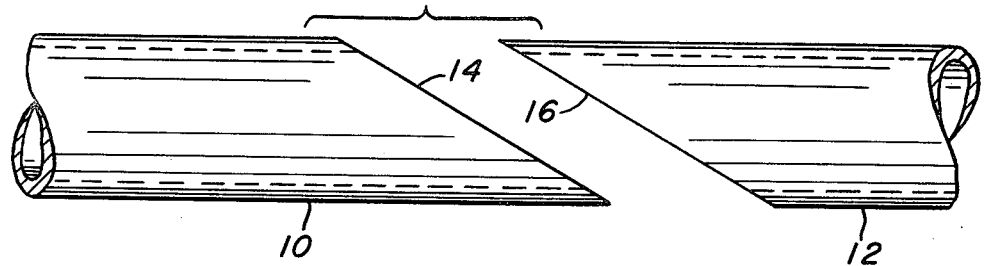
FIG. 1 is an elevation view of the end portions of two relatively thin wall tubes provided with complementary cuts extending at angles substantially less than 90° with respect to the axes of the tubes.

Referring now to FIG. 1 of the drawing, there is shown two, relatively thin wall tubes 10 and 12 provided with complementary cut ends 14 and 16, the cuts of the ends extending at an angle less than 90° with respect to the axes of the two tubes. In actual practice, the angle of the cuts should be such that when the weld is formed in joining the tube ends together, the weld bead covers the inner and outer extremities of the thickness of the tube wall without being excessively wide. If the angle of the cut ends, and thus the angled, annular interface 18 (FIG. 5) between the tube ends, is too shallow for a given tube wall thickness, a wide weld area is required to cover the extremities of the tube wall, which, in turn, requires excessive welding time and materials, or, a weld bead is formed that does not reach the extremities of the tube walls, with the result that stress risers occur that tend to weaken the weld.

On the other hand, if the angle of the tube cuts 14 and 16 are too steep, i.e., approach too closely the common, 90° cut, for a given wall thickness, the weld area joining the tubes together is weakened in the above discussed multiple draw process such that it is an unreliable weld for the purposes of the present invention.

The ends of tubes 10 and 12 are preferably cut by a rotary metal saw (not shown) having a carbide edge or tip, the carbide edge or tip providing a relatively smooth finish on the tube ends so that little or no finishing is required before the ends are disposed together for welding. Where such finishing is required, a milling tool may be used, as shown, for example, in FIG. 7 of the drawings, and may have an axis of symmetry such that the same tool is used to cut the ends of both tubes.

However, before the tubes 10 and 12 are cut it is desirable that an end length of each tube be annealed if the metal of the tube is hard or relatively hard. In welding together the ends of high strength aluminum alloy tube for multiple draw purposes, for example, it has been found desirable to fully anneal about a 20 foot end portion of each tube, and partially anneal a 5 foot or so length of each tube, the 5 foot length providing a transition area between the full anneal and no anneal portions of the tube.

After the tubes 10 and 12 are annealed and cut and any burr removal and chip collection functions performed that may be needed, the tubes may be straightened to provide straight tube portions between clamping devices 20 and 22 of the welding apparatus depicted diagrammatically in FIG. 3 and the cut ends 14 and 16 of the tubes so that the tubes can be properly aligned and mated for the welding operation at welding location head 24. The clamping devices themselves will tend to straighten the tubes for this purpose.

More paticularly, for the welding operation, the annealed, cut end portions of the two tubes 10 and 12 are disposed respectively in clamps 20 and 22 of tube clamping and rotating assemblies 26 and 28 of the welding apparatus, depicted in FIGS. 3 to 6. The assemblies 26 and 28 are mounted respectively in two supporting structures generally designated 27 in a manner presently to be explained. The clamping and rotating assemblies, including tube clamps 20 and 22, are axially aligned, and are substantially identical so that only one (28) of the assemblies will be described in detail, with reference to FIGS. 4, 5, 6 of the accompanying drawings.

Figure 4:
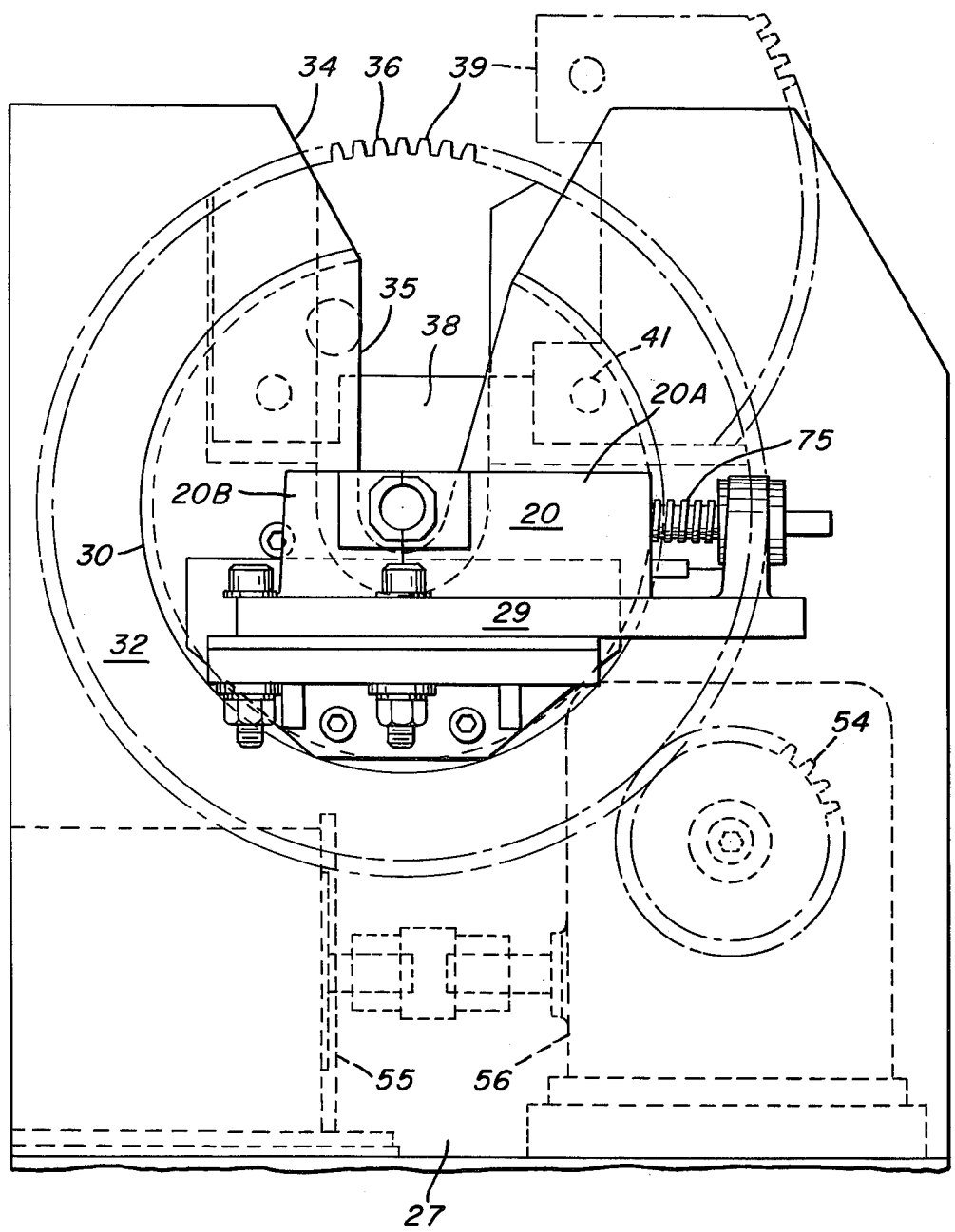
FIG. 4 is a detail, front elevation view of a bearing and split gear arrangement for rotating one of the tubes of FIGS. 1 and 2.
Figure 5:
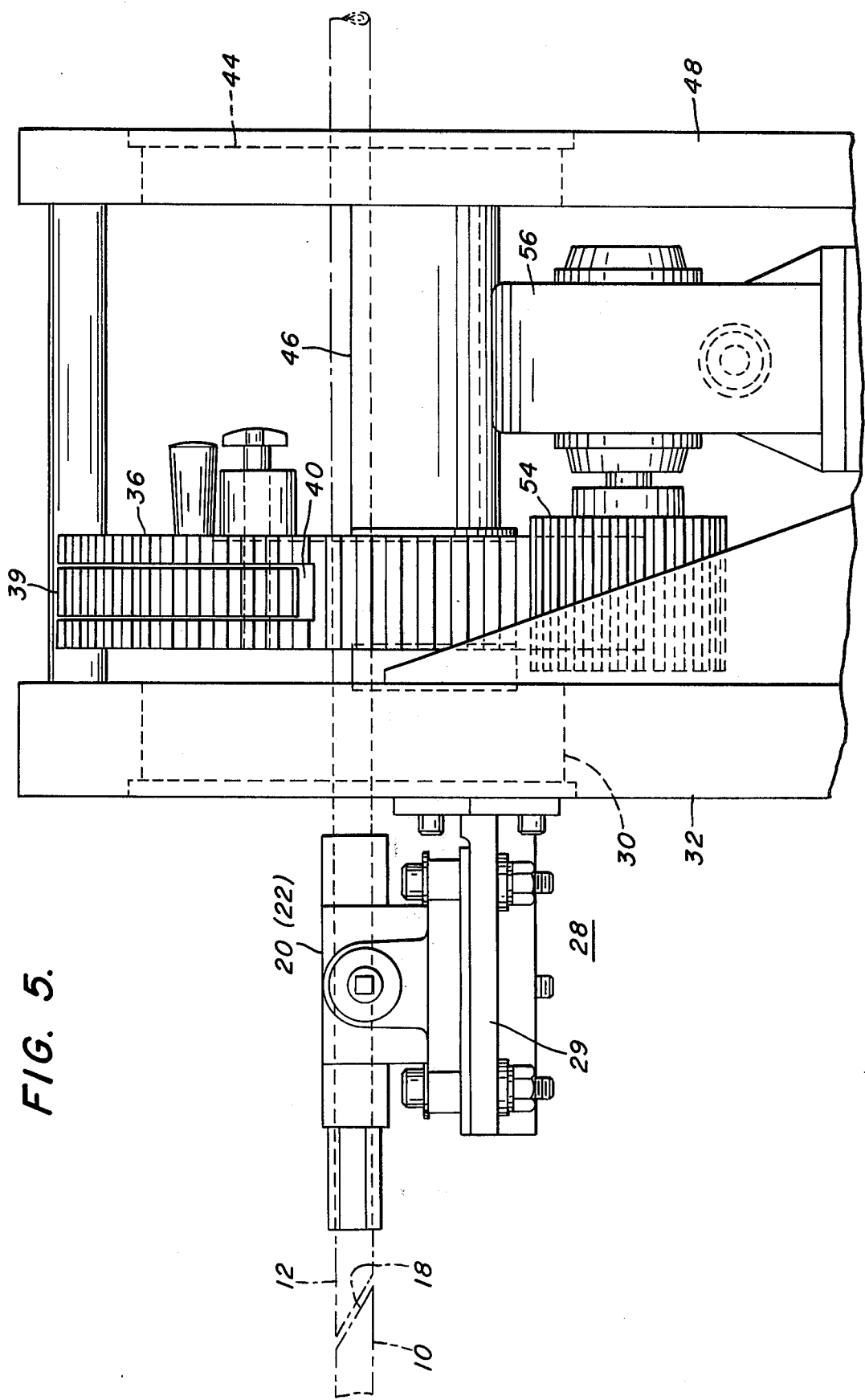
FIG. 5 is a side elevation view of the arrangement of FIG. 4.

Referring now to the detail view of FIGS. 4 and 5, the tube clamp 20 (or 22) of the clamping assemblies is shown as a two piece structure having a mechanically translatable half 20A and a fixed half 20B. The clamp is shown mounted on a platform 29 which is bolted to the front face of a bearing member 30, the bearing member being mounted in a forward supporting wall 32 of structure 27. The front face of the bearing member is flush with the front face of the supporting wall. The upper portion of the supporting wall is provided with a tapered opening 34 that is shown in FIG. 4 in alignment with a V or U-shaped recess 35, provided in the bearing member 30, the recess 35 extending radially into the bearing member a distance that includes the radial center of the bearing and the axis of clamp 20 to accommodate a tube (10 or 12) placed therein and at the radial center of the bearing.

Integral with and located immediately behind bearing 30 is a "split" gear 36, as best seen in FIG. 5, having a deep, radially extending recess 38 (FIG. 4) reaching inwardly to a location beyond its axial center and in alignment with the recess 35 of bearing 30. The recess in gear 36 is shown closed, in FIGS. 4 and 5, by a gear section 39 pivotally mounted in a peripheral recess 40 provided in the main body of the gear, as seen in the elevation view of FIG. 5. The means providing the pivotal mounting is indicated by numeral 41 in FIG. 4. The location of the gear section 39 is such that when the gear section is rotated into the closed position about pivot 41, the teeth of the gear section are located in alignment with the teeth of the main gear on each side of the gear section. This is best seen in FIG. 5.

Figure 6:
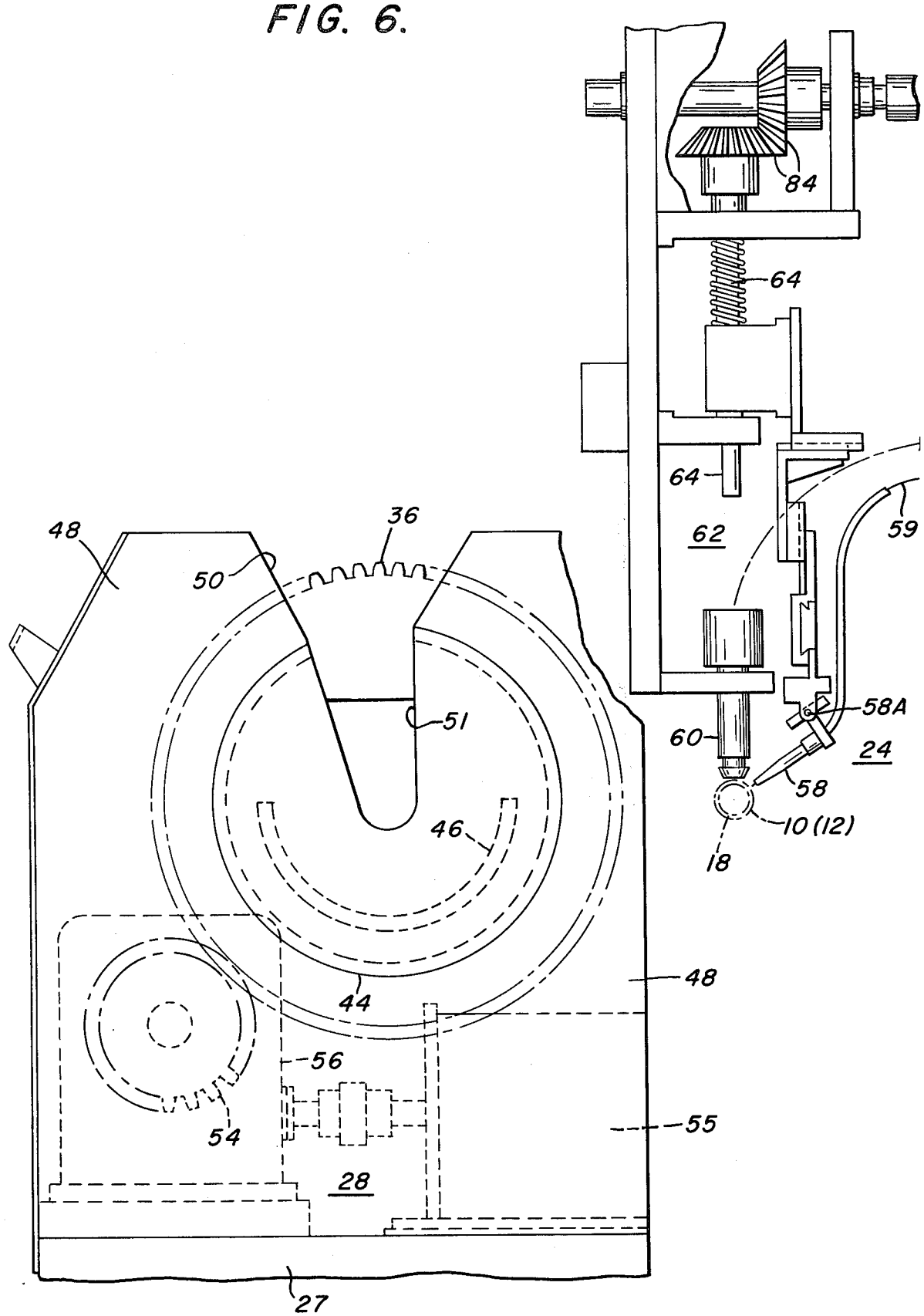
FIG. 6 is a rear elevation view of the arrangement of FIG. 4, and a detail elevation view of a welding head for joining the tubes of FIGS. 1 and 2 together.

Attached to the rear face of gear 36 and extending between the gear and a second bearing member 44 is a semicircular housing 46 mechanically connecting the gear and the second bearing member together. The second bearing member is mounted in a bearing support wall 48 (similar to bearing wall 32) provided with a tapered opening 50 in the upper portion thereof, as seen in FIG. 6, the opening 50 being shown in registration with a deep, radially extending recess 51 provided in bearing member 44. The opening 50 and recess 51 are aligned respectively with the opening 34 and recess 35 of the front bearing support and bearing member, with the semicircular connection member 46 being positioned to present an open face in the direction of the recesses 35 and 51 and openings 34 and 50.

The bearing members 30 and 44 are rotated within their bearing supports 32 and 48 by a drive gear 54 located to rotate in meshing engagement with the split gear 36 and gear section 39. The drive gear is driven by a suitably powered motor 55 through a speed reducing gear arrangement 56, as best seen in FIG. 5.

At the welding location or station 24, a welding head arrangement is shown in FIG. 6 comprising an adjustable, hollow fixture or nozzle 58 adapted to feed welding wire filler material 59 to the angled tube interface 18 (FIG. 5) of the mating tube ends for the welding operation. The feed nozzle is supported closely adjacent a welding electrode 60, the feed nozzle and electrode being supported on a structure 62 that is laterally movable so as to follow the angled interface of the mating tube ends for the welding process, as explained in detail hereinafter. Further, the wire feed fixture 58 is supported on and keyed to a vertical shaft 64 so that it is rotatable about the electrode 60, for reasons explained in detail hereinafter.

Figure 2:
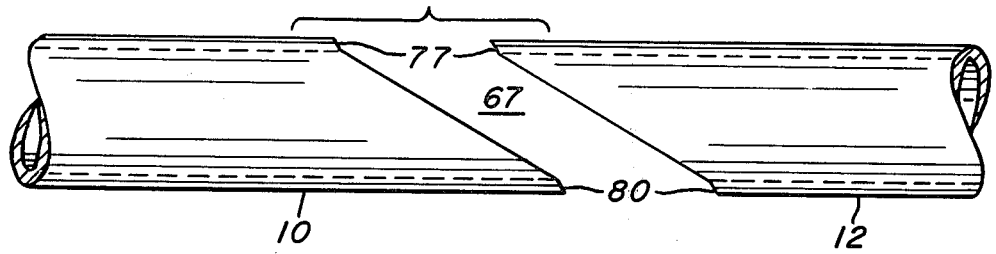
FIG. 2 is an elevation view of the end portions of two relatively thin wall tubes provided with complementary compound angle cuts at the ends thereof.
Figure 7:
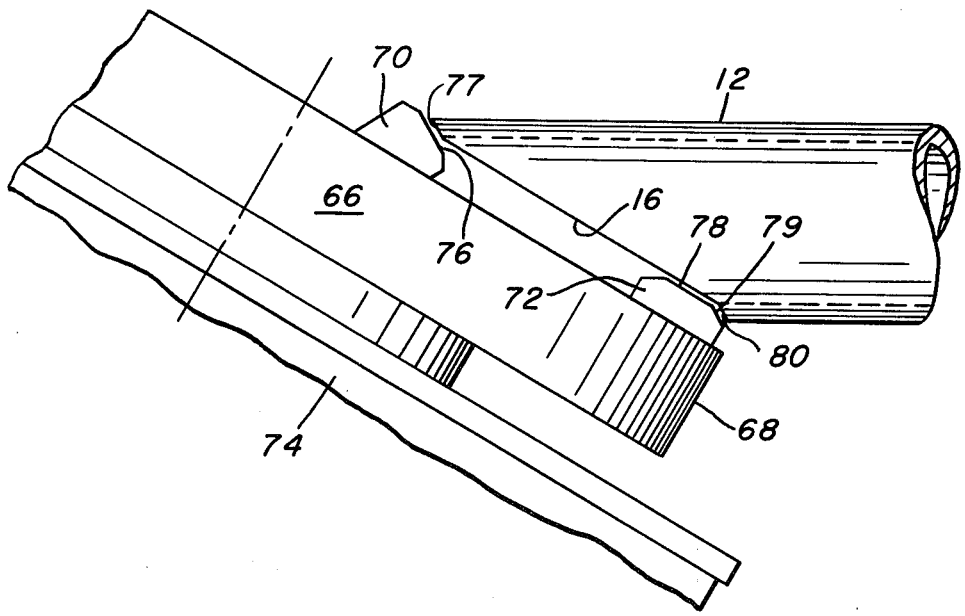
FIG. 7 is a side elevation view of a milling tool used to provide the compound angle cuts of FIG. 2.

As depicted in FIG. 7 of the drawings, the cut ends of the tubes 10 and 12 may be milled by a milling tool, generally designated 66, before the tube ends are welded together. If the saw cuts of the tubes are unduly rough, milling may be required, or, if it is desired to provide the tube ends with complementary compound angle cuts 67, such as shown in FIG. 2, the milling tool 66 is particularly useful.

The milling tool depicted in the elevation view of FIG. 7 includes a head member 68 providing the support for two, circular, concentric arrays of identical milling cutters 70 and 72, only two of the cutters being visible in the view of FIG. 7. The head is rotationally mounted on a support 74 located between the tube clamping assemblies 26 and 28, as seen in FIG. 3, the support being alternately positionable in a tilted or angled manner opposite the tube ends such that the one head and cutter arrays can be employed to mill the angled, cut ends of both sides.

In welding of the tube ends together using the apparatus of FIGS. 3 to 6, as thus far described, the clamp halves 20A of the two clamping assemblies 26 and 28 are separated from their associated fixed halves 20B, by operation of the threaded shaft 75, depicted in FIG. 4, a distance sufficient to accept tube portions 10 and 12 for rigid clamping between the clamp halves. In locating the tube portions between the clamp halves, the tubes are also disposed in the recesses 35, 38 and 51 of the bearings and split gear, and into the semicircular housing 46 extending between the split gear and the rear bearing member 44 of each assembly. In FIGS. 3 and 5, the tubes are indicated in dash outline and may extend rearwardly from the rear bearing members to two respective stationary coiled supplies thereof that are not shown in the drawings.

If any finishing of the tube ends or edges 14 and 16 of FIG. 1 is required, such finishing is now performed, as for example, by the milling tool 66 briefly described above. If the compound angle cut 67 (FIG. 2) is preferred, this cut is now made by the concentric arrays of cutters 70 and 72 of the milling tool, with the tube end portions being firmly clamped by clamps 20 and 22. To make the compound angle cuts, the milling tool is raised, in the embodiment of FIG. 3, from the lowered position shown in FIG. 3, to the level of a first one of the tube ends (14 or 16) with the head 68 properly angled such that when the milling head is rotated about its axis and against the tube end one cutting edge 76 of milling cutter 70 provides a finished surface 77 (on the tube end) that is disposed at a predetermined angle with respect to the tube axis and the angle of the cut 16. In a similar manner, cutting edges 78 and 79 of milling tool 72 finish respectively the straight angle surface of cut end 16 and a third cut and finished surface 80 diametrically opposite surface 77, but at the same angle as surface 77, as shown in FIGS. 2 and 7. The cutters 70 and 72 are identical though they are not disposed at the same angle. In FIG. 7, the angles of the two cutters are 30° apart. As shown in FIGS. 2 and 7, the angles of finished surfaces 77 and 80 are approximately 60°, while that of surface 16 is about 30°.

To mill the first tube, the tool is moved past the tube end in the direction of welding head 24; to mill the second tube, support 74 is rotated 60°, by suitable means not shown, about a horizontal axis extending into the plane of the paper of FIG. 3 and moved past the end of the second tube in a return direction away from the welding head. In this manner, both tube ends 14 and 16 are readily and quickly finished and provided with a compound angle cut, if desired.

With the tube ends properly cut and finished, and tightly clamped by clamps 20 and 22, the tube ends are placed in abutting, mating relationship, as indicated in phantom outline in FIG. 5. This is accomplished by moving the supporting structures 27 of the clamping assemblies 26 and 28 toward each other along a platform structure 82 (FIG. 3) using suitably constructed translating devices (not shown) until the tube ends engage each other.

With the tube ends located in abutting relationship and firmly clamped, both clamping assemblies 26 and 28 are now simultaneously moved rearwardly to the welding location 24 by rearward movement of platform 82, again, by suitable moving means and structures not shown. Rearward movement of the clamping assemblies is stopped when the axes of tubes 10 and 12 are located beneath welding electrode 60.

To effect the welding of the tube ends together, electrical power is applied between the welding electrode 60 and the tubes, to provide an arc between the electrode and tube ends, while filler material 59 is fed to the tube ends and interface 18 at a precisely controlled rate, and while the interface and tube portions are slowly rotated by the clamping assemblies, again, at a precisely controlled rate. The rotation of the clamping assemblies is effected by drive gear 54, the drive gear being rotated by a suitable motor (not shown) driving the gear through speed reduction unit 56. Except for the beginning and ending rates, the rate of the feed of the filler material is linear and constant.

As the tubes and the angled interface 18 rotate beneath electrode 60 and the rod material nozzle 58, the interface moves laterially (back and forth) the angled distance of the interface so that the electrode and nozzle must follow the lateral movement of the interface in order to weld the tubes together along their angled, abutting ends. Thus, the mechanism 62 supporting the electrode and filler material nozzle is laterally movable, as indicated by the opposed arrows in FIG. 3; in FIG. 6, lateral movement is into and out of the plane of the paper.

In order to effect a sound weld of the tube ends together, and a weld that can withstand the forces and conditions encountered in a simultaneous, multiple draw process, for example, the angle of the filler material 59 with respect to the location of the interface 18, as it moves laterally, must be maintained substantially constant in order to insure proper disposition of weld material at the interface. This is accomplished by moving the nozzle 58 about a vertical axis, via rotation of supporting shaft 64, the rotation of the shaft being effected through rotation of bevelled gears 84 (FIG. 6) by operation of a suitable, reversible motor not shown. The motor reverses the direction of movement of the nozzle when the interface changes lateral direction during rotation of the tubes.

The rod material 59 is initially correctly angled with respect to the tube surface by adjusting the angle of the nozzle 58 about a horizontal pivot location 58A (FIG. 6) provided on supporting structure 62.

The tubes and the weld interface can rotate a full 360 degrees in one direction for the welding operation, or the tubes may be rotated approximately 180 degrees in one direction before welding and then rotated approximately 360 degrees in the opposite direction during welding, with some overlap of the rotational distance traveled, in either case, to insure completion of the weld about the tube ends. Reversal of the direction of tube rotation is effected by reversing the motor driving drive gear 54. The material of tube portions 10 and 12 is thus required to absorb the twist of the rotation if the tube portions are respectively the integral end portions of two, fixed supplies of tubing. The annealing and partial annealing of the tubes discussed earlier aids the tubes in absorbing the twist for the welding process.

After the weld is effected, the clamping assemblies 26 and 28 are moved forwardly to the position in front of the welding station 24 shown in FIG. 6. The tube clamps 20 and 22 are opened, and the pivotal gear section 39 is rotated out of the split gear 36 to open recess 38. This permits removal of the tubes from the clamping assemblies and allows placement of another set of tubes in the clamping assemblies for a repeat of the above welding operation.

Straight end cuts on the tube ends using complementary angles of less than 75° but greater than 20 degrees have been found to provide a more than adequate weld employing the welding procedures just described. The 30 degree cuts shown in FIG. 1 and the subsequent 30 degree weld, for example, provides a sufficiently narrow wall thickness such that the extremities of the tube walls created by the angle of the cuts are covered by a relatively narrow weld bead. Such a weld bead enters each drawing die of the apparatus discussed earlier, in a gradual, though rapid, manner so that the weld area and bead is gradually reduced in thickness and diameter without cracking or breaking. Similarly, the 30° angle weld has been found to bend around each capstan without tending to unduly stress the weld areas remote from the surface of each capstan, as is the tendency with 90° butt welds. It is believed that the angled overlap of the tube wall material on and closely adjacent the curved surface of the capstan tends to bend more easily (than a 90° butt weld) on the curved surface as the tube is wound thereon, thereby tending to reduce stresses at the outer location of the weld.

In a similar manner, the compound weld discussed above in connection with FIGS. 2 and 7 is able to withstand the drawing and bending forces encountered in a simultaneous, multiple draw process described above. The 60 degree weld portions of a compound weld that would be provided by the compound angle cuts depicted in FIG. 2, for example, provide gradual entry into the drawing dies of the weld and reduced bending stresses on the weld as the tube wraps around the capstans.

While the invention has been described in terms of preferred embodiments, the claims appended hereto are intended to encompass all embodiments which fall within the spirit of the invention.

Having thus described our invention and certain embodiments thereof, we claim:

1. A method of welding the ends of tubes together for drawing purposes, the method comprising the steps of
   providing the tube ends with complementary angle cuts, the angle of each cut being less than 90° with respect to the axes of the tubing,
   placing and maintaining the cut ends of the tubes in mating, abutting relationship, the abutting ends providing an interface therebetween that is disposed at the same angle, with respect to the tube axes, as that of the angle cuts,
   disposing said interface adjacent a welding head, and
   welding the tubes together along the interface of the mating, abutting ends to provide a high strength welded joint between the tubes.

2. The method of claim 1 in which the angle cuts and the interface therebetween comprise a compound angle with respect to the tube axes.

3. In the method of claim 1 including the step of annealing a longitudinal portion or each tube before the ends of the tubes are welded together.

4. The method of claim 1 including the steps of annealing a first longitudinal portion of each of the tubes to be joined together, said longitudinal portion including the ends to be joined together, and
   partially annealing a second longitudinal portion of the tube adjacent the first longitudinal portion but spaced from said tube ends, the partially annealed portion providing a transition area between the annealing portion of the tube and the portion thereof having no anneal.

5. The method of claim 4 in which the annealing steps take place before the tube ends are provided with the angle cuts.

6. The method of claim 1 in which the portion of each tube adjacent the end provided with the angle cut is straightened before the tubes are welded together.

7. The method of claim 1 in which the tubes and the interface are rotated beneath the welding head to effect a weld of the tubes at the interface.

8. The method of claim 7 in which the welding head travels the longitudinal distance of the angle of the interface as the tubes and interface are rotated.

9. The method of claim 1 including the steps of
   respectively disposing the two tubes in split, rotatable gears located on opposed sides of and spaced from the welding head before the cut ends of the tubes are disposed in mating, abutting relation, and
   after the cut ends are disposed in mating, abutting relation and are located closely adjacent the welding head, rotating the split gears to effect rotation of the tubes and interface for the welding step.

10. A method of preparing metal tubes for welding ends thereof to one another, the method comprising the steps of
    annealing a first longitudinal portion of each tube, said longitudinal portion including the ends of the tube to be welded,
    partially annealing a second longitudinal portion of each tube adjacent said first portion but spaced from said end, and
    providing the tube ends to be welded together with complementary angle cuts, with the angle of each cut being less than 90° with respect to the axes of the tubes.

11. A method of joining the ends of two tubes together, the method comprising the steps of
    providing the tube ends with complementary, compound angle cuts, with each cut comprising two cuts extending through the wall of each tube from opposed, axially spaced locations along the length of each tube, and two cuts extending through the tube wall and diagonally between the axially spaced cuts around, respectively, opposed sides of the tube,
    placing and maintaining the cut ends of the tubes in mating, abutting relationship, the abutting ends providing an interface that is a compound angle corresponding to those of compound angle cuts, and
    welding the tubes together along said interface.

12. The method of claim 11 including the steps of
    first cutting the walls of the tubes with a cutting means that provides each tube with a straight angle cut end, and, thereafter,
    milling the cut ends of the tube wall to form the compound angle cut.

* * * * *